United States Patent [19]

Heinzer

[11] 3,826,573

[45] July 30, 1974

[54] METHOD OF RECORDING AND REPRODUCING INFORMATION IN THE FORM OF ELECTRICAL CONDUCTIVITY DIFFERENCES

[75] Inventor: Paul Heinzer, Geneva, Switzerland

[73] Assignee: Battelle Memorial Institute, Geneva, Switzerland

[22] Filed: June 16, 1971

[21] Appl. No.: 153,807

[30] Foreign Application Priority Data

June 17, 1970 Switzerland ........................ 9151/70

[52] U.S. Cl. .................... 355/133, 96/1.1, 101/426, 340/173 TP, 355/77, 355/132

[51] Int. Cl. ................................ G03b , B41m 5/18

[58] Field of Search ........... 355/133; 96/1.1, 33, 35; 101/426; 340/173 TP

[56] References Cited

UNITED STATES PATENTS

| | | | |
|---|---|---|---|
| 3,436,216 | 4/1969 | Urbach | 340/173 TP |
| 3,450,531 | 6/1969 | Amidon et al. | 96/35 X |
| 3,482,973 | 12/1969 | Amidon et al. | 96/35 |
| 3,654,864 | 4/1972 | Ovshinsky | 101/426 |
| 3,719,482 | 3/1973 | Goffe | 96/1.1 |

*Primary Examiner*—Richard L. Moses
*Attorney, Agent, or Firm*—Waters, Roditi, Schwartz & Nissen

[57] ABSTRACT

Information recording material sensitive to the action of activating radiation, at least part of the thickness of which. from the surface thereof, consists of a homogeneous dispersion of electrically conductive particles in an insulating binder essentially consisting of a substance or composition having swelling and/or solubility properties that can be modified through exposure to activating radiations. This material is able to yield a recording of information in the form of electrical conductivity differences after firstly being exposed to said radiations, modulated according to the information to be recorded, and secondly being treated to cause the exposed parts and the unexposed parts to swell differently. This material can be used, for instance, for reproducing documents, for taking X-ray pictures and for taking pictures in electronic microscopy.

22 Claims, No Drawings

METHOD OF RECORDING AND REPRODUCING INFORMATION IN THE FORM OF ELECTRICAL CONDUCTIVITY DIFFERENCES

The present invention is directed to methods of using information recording material sensitive to the action of activating radiations.

According to the invention at least part of the thickness of the material, from its surface, consists of a homogeneous dispersion of electrically conductive particles in an insulating binder essentially consisting of a substance or composition having swelling and/or solubility properties that can be modified by exposure to activating radiations, said material being able to yield a recording of information in the form of electrical conductivity differences after firstly being exposed to said radiation, modulated according to the information to be recorded, and secondly being treated to cause the exposed parts and the unexposed parts to swell differently.

In the present specification the generic term "activating radiations" means any radiations capable of causing or assisting chemical reactions and/or physical property changes. These radiations include for example actinic radiations (electromagnetic waves able to produce or initiate chemical reactions) of high energy, for instance ionising radiations such as gamma rays or X-rays; high-energy particulate emissions, for instance alpha rays, beta rays (electron beams), neutron beams and ion beams; radiations of lesser energy but nonetheless strongly actinic such as ultra-violet radiations; the weakly actinic radiations of the visible part of the electromagnetic spectrum; and infra-red radiations.

The substance or composition having swelling properties that can be modified through exposure to activating radiations may be a polymerizable compound, for instance a monomer or a prepolymer, or a mixture of at least two copolymerizable monomer or prepolymerized compounds. This substance may also consist of a polymer, of a mixture of polymers, or of a mixture of at least one polymer and of at least one monomer, which are capable of undergoing, under the influence of electromagnetic radiations, cross-linking or grafting, or, conversely, depolymerization or partial degradation. This substance may also consist of a polymer having amorphous parts and crystalline parts distributed at random or in uniform manner in the polymer, prior to irradiation thereof, and able to modify their state of crystallinity by becoming, as the case may be, either all amorphous or all crystalline in the irradiated areas. The main substance forming the binder may in itself be photo-sensitive and the above indicated transformations may result from its photo-sensitivity properties. Alternatively, this substance may in itself not be photo-sensitive or only slightly so and the above transformations can be brought about by acting on this substance with one or more auxiliary photo-sensitive substances.

As a polymer or mixture of polymers capable of undergoing crosslinking under the action of the activating radiations, use can for instance be made of those described in the following publications: J. KOSAR, Light-sensitive Systems, J. Wiley and Sons 1965; G. A. DELSENNE, Synthesis And Photocrosslinking of Light-sensitive Polymers, European Polymer Journal, Supplement 1969 pp. 55–91; J. L. R. WILLIAMS, Photopolymerization and Photocrosslinking of Polymers, Fortschr. Chem. Forsch. Bd. 13/2, 227, 1969. In particular, the following substances can be used:

polystyrene, polyisoprene, polyvinyl chloride, polyvinyl alcohol, polyvinylpyrrolidone, polyvinyl acetate, polyvinyl cinnamate; polyethylene; poly(vinyl-trans-benzalacetophenone); copolymers of ethyl acrylate and of 7-acryloxycoumarin; poly(4-styrylpyridinium)-N-vinylaryl sulphonate; poly [β-(2-furyl)vinylpyridinium] -N vinylaryl sulphonate or the partially hydrolyzed acetal of polyvinylacetate 9-anthracene.

As a polymer or mixture of polymers capable of undergoing grafting under the action of activating radiations, use can for instance be made of those described in the following publications: J. RABEK, Photochem. and Photobiology, 1968, Vol. 7, pp 5–57; British patent specification No. 924,238 (Gevaert-Agfa); J. Polymer Sc. Part C No 23, pp 433–439, 1968. In particular, the following substances can be used:

polyethylene; peroxidized polyethylene; polypropylene; polyisobutylene; natural rubber; polyacrylates and polymethacrylates; peroxidized poly (methyl methacrylates); polyvinyl chloride; polyvinyl alcohol; polytetrafluoroethylene; polystyrene; polyacrylonitrile; polyvinyl acetate; polyvinylpyrrolidone; polyamides; polydimethyl siloxanes; polyesters, for instance poly(ethylene terephthalate) and styrene-poly(ethylene maleate) resins; cellulose and cellulose derivatives, for instance cellulose diacetate.

In particular, as monomers capable of being grafted, under the action of activating radiations, on the above polymers, the following can for example be used:

— on polyethylene: styrene; methyl methacrylate; vinyl acetate; acrylonitrile, vinylidene chloride,
— on peroxidized polyethylene: acrylonitrile; methyl methacrylate,
— on polypropylene: acrylonitrile,
— on polyisobutylene: various vinyl monomers, for instance styrene,
— on natural rubber: acrylonitrile; styrene; parachloro- and dichloro-2,5-styrene; methyl methacrylate,
— on poly(methyl methacrylate): vinyl pyrrolidone; vinyl acetate; styrene; ethyl acrylate; acrolein; acrylonitrile,
— on poly(butyl methacrylate): vinyl acetate and styrene,
— on poly(ethyl acrylate): methyl methacrylate,
— on peroxidized poly(methyl methacrylate): styrene,
— on polyvinyl chloride: acrylonitrile, styrene; methyl methacrylate; diallyl esters, for instance triallyl cyannurate and diallyl sebacate,
— on polyvinyl alcohol: styrene; methyl methacrylate; acrylonitrile; acrylamide; vinylpyridine and methylvinylpyridine,
— on polytetrafluoroethylene: vinyl acetate; styrene; butyl methacrylate,
— on polystyrene: acrylonitrile; acrylamide; methyl methacrylate,
— on polyacrylonitrile: ethyl acrylate,
— on polyvinyl acetate: methyl methacrylate; butyl methacrylate; styrene and acrylonitrile,
— on polyvinylpyrrolidone: acrylonitrile,
— on poly (hexamethylene-adipamide): styrene, ethyl acrylate; acrylic acid; acrylonitrile; vinyl acetate; methyl and vinyl acetates, — on poly(caprolactam) acrylonitrile; styrene and methyl methacrylate,
— on poly(ethylene-terephthalate): styrene; acrylonitrile; methyl methacrylate,
— on styrene-poly(ethylene-maleate) resins: acrylonitrile,
— on polydimethylsiloxane: acrylonitrile and methyl methacrylate.

As a mixture of polymers capable of being cross-linked with each other (cross-linking through grafting), the following can for example be used:
— polyethylene and polyisobutylene,
— polyethylene and crepe rubber,
— polyethylene and polystyrene,
— polyethylene and polyamide, in particular poly(hexamethylene-adipamide),
— polyethylene and polyvinyl alcohol,
— polyisobutylene and polystyrene,
— polyacrylates and polymethacrylates,
— polybutyl methacrylate and polyvinyl acetate,
— polybutyl methacrylate and polystyrene,
— polymethyl methacrylate and polyvinyl acetate,
— polymethyl methacrylate and polystyrene,
— polyvinyl chloride and butadiene-styrene copolymer,
— polystyrene and polyacrylonitrile,
— polyvinyl acetate and cellulose acetate,
— polyvinylpyrrolidone and polyacrylamide,
— cellulose acetate and polyacrylonitrile.

As a polymer or mixture of polymers capable of undergoing depolymerization or partial degradation under the action of electromagnetic radiations, use can, for instance, be made of those described in the following publications: Photochem. and Photobiology 1968, Vol. 7, pp 5–57 (already mentioned); N. GRASSIC, Chemistry of High Polymer Degradation Processes; E. M. FETTES, Chemical Reaction of Polymers (Interscience Publish. 1964); A. CHAPIRO, Radiation Chemistry of Polymeric Systems (Interscience Publish. 1962). In particular, the following substances can be used: polyisobutylene; methyl polymethacrylate; poly(t-butyl methacrylate); polytetrafluoroethylene; cellulose; poly($\alpha$-methylstyrene); polymethacrylonitrile; polychlorotrifluoroethylene.

As regards more particularly the substances or compositions specifically sensitive to the action of ultraviolet radiations, use can for instance be made of those described in the following publications: J. Appl. Polym. Sc. Part C No 23, pp 433–439 (1968), already mentioned; Makrom. Chemie 103, p. 301 (1967); Polymer 8 No 10, p. 497 (1967); Ibid: 9 No 1, p. 25 (1968). In particular, poly(tetramethylene sebacate-co-gamma-ketopimelate), (formation of a block copolymer with methyl methacrylate), can be used.

As regards the auxiliary photosensitive substances and the photopolymerizable systems containing these substances, use can for example be made of those described in the following documents:

G. DELZENNE: Ind. Chim. Belge 24 pp 739–764 (1959)

| | | |
|---|---|---|
| Belgian patent specification | No 725,625 | (Gevaert-Agfa) |
| British patent specification | No 1,165,570 | do. |
| do. | 1,180,846 | do. |
| do. | 1,066,083 | do. |
| U.S. patent specification | No 3,429,795 | |

In particular, the following auxiliary photosensitive substances can be used: benzoin and its derivatives; dicarbonyl acids; disulphonyl acids; diaryl acids; dialkyl acids; bis(1,2,3-thiadazole); bis(o-quinone diacids); azoic and diazoic compounds; sulphur-containing derivatives of the mercaptan type; dithiocarbamic ester; di- and polysulphides; and the following photopolymerizable systems can be used:

acrylonitrile and acetone; vinyl chloride and acetone; methyl isopropyl ketone and acetone; styrene and acetone; butadiene and acetone; monomers of general formula $CH_2=CXY$ (where $X=H$, a halogen or a hydrocarbide; $Y=COOR$, $CONH_2$ or $CN$; $R=H$ or a hydrocarbide) and at least one of the following sensitizers: biacetyl; 2,3-pentadione; 2,3-octadione; benzile and phenylglyoxal; vinyl and vinylidene derivatives and phenylglyoxal biacetyl; isoprene, styrene, vinyl acetate, methacrylic acid and at least one of the following sensitizers: benzophenone, benzanthrone, benzaldehyde; benzil, acetaldehyde, biacetyl, phenanthraquinone, tert-butyl 2-anthraquinone; vinyl chloride and cyclohexanone.

As photopolymerizable monomers, use can for example be made of those described in the already mentioned book of A. CHAPIRO, Radiation Chemistry of Polymeric Systems, and in particular the following monomers: styrene, methyl methacrylate, vinyl acetate, methyl acrylate, butadiene, isoprene, alphamethylstyrene, diacrylates and dimethacrylates, acrylonitrile, vinyl chloride, chlorotrifluoroethylene, various perfluorinated monomers, isobutylene, ethylene, acrylamide, vinyl stearate, vinylcarbazole, and hexamethylcyclotrisiloxane.

Depending on the nature of the binder, the irradiated parts of the material become swellable (in particular in the case where they undergo depolymerization) or, conversely, they lose this property whereas the non irradiated parts retain it (in particular in the case where the irradiated parts become polymerized or cross-linked). Also depending on the nature of the binder, the swelling can be brought about either by the action of a suitable swelling liquid or by heat.

As conductive particles, use can equally well be made of metallic particles and of non-metallic conductive particles, for example particles of graphite and particles of conductive metallic oxides. By way of metallic particles, use can be made of particles of metals or of alloys, for instance highly conductive metals such as copper, iron, nickel, silver and aluminum. Use can also be made of metals having a large effective ionisation section such as lead and antimony. By using metals having a large effective ionisation section the primary radiant effect can be amplified by virtue of the secondary emission from the particles of these metals. The shape of these conductive particles can be regular, e.g. spherical or oval, or be irregular (fragments produced by grinding larger pieces). These particles may consist of a conductive or non-conductive, porous or compact, core of which the surface is coated with a conductive material and of which the pores, if any, may contain a conductive material. The grain size of these particles preferably lies between 0.1 and 100 microns. This grain size is preferably uniform whereby the electric conductivity of the material in the initial state (before use) of the latter may be homogeneous. In some cases it may however be of advantage, in order for the dispersion to be well filled with conductive particles, to use particles of several well-defined grain sizes so that the finest particles may come to be located in the interstices between the largest particles. The concentration of conductive particles in the dispersion preferably lies between 10 and 80 percent by volume.

The concentration of the conductive particles in the dispersion, the conductivity, the size, the shape of these particles and the resistivity of the binder are preferably so chosen that there may be obtained a variation in the conductivity of the material in a ratio of $10^3$ by varying the thickness of the material whereby an image having a good contrast and possibly a gradation of the intensity of the various parts of the image.

The absolute value of the initial resistivity and of the final resistivity of the material is chosen in dependence on the way the latter is to be used and on the method by which the resulting latent image is developed. For example, material intended for electrostatic development preferably has an initial resistivity of the order of $10^{10}$ ohm. cm and a final resistivity, in its most resistive parts, of at least $10^{13}$ ohm. cm. Preferably, this latter resistivity is even of the order of $10^{15}$ ohm. cm. Material intended for electrolytic development preferably has an initial resistivity of the order of for example $10^2$ ohm. cm and a final maximum resistivity of the order of $10^4$ to $10^6$ ohm. cm. Of course, the greater the resistivity variation through swelling of the material, the better will be the contrast and the intensity gradation that can be obtained.

As regards the absolute value of the conductive particles as such, use is preferably made of particles from material having resistivities ranging for example from about $10^{-6}$ ohm. cm to about $10^{-3}$ ohm. cm. As for the corresponding values for the binder, they range for example from $10^8$ to $10^{16}$ ohm. cm. Depending on the case, the entire thickness of the material or only part of this thickness may be formed by the dispersion of conductive particles. In the latter event, the remainder of the thickness of the material is formed by a support of which at least that part which is in contact with the dispersion is conductive. This support may, for example, consist of a sheet of paper coated with a thin conductive layer, e.g. aluminum foil, in contact with the dispersion.

The dispersion layer may be applied to the support not only in the form of a continuous layer but also in the form of a discontinuous layer made up of strips, dots, smudges, etc., whether evenly distributed or not, the thickness of this discontinuous layer being however the same throughout the layer in the initial state of the material. The advantage of so dividing the layer is to avoid the phenomenon of tint weakening at the centre of layer regions or areas of the image during electrostatic development, this well-known phenomenon being due to a preferential accumulation of electric charges at the periphery of such regions.

The thickness of the dispersion layer, i.e. of the deformable part of the material, preferably lies between 5 and 500 microns. The overall thickness of the material depends on the way it is to be used and on the required mechanical strength, for instance the resistance to tearing, of its constituent parts.

As regards the general shape of the material, it can be very varied. Thus, the material can for example have a generally flat shape, for instance in the form of flexible or rigid sheets, of strips, and of sheets wound over the outer or inner surface of a cylindrical drum. The material may also be in the form of a filament, of a flexible or rigid rod or bar of circular, oval or polygonal cross-section, etc.

The material which has just been described, can be made by a process which essentially consists in producing the mixture of the conductive particles and of the binder in such a manner as to obtain a perfectly homogeneous dispersion. In particular, in the case where the binder essentially consists of a polymerized substance, the particles are first placed in homogeneous suspension within the monomer being used to make the polymer, possibly in the presence of a polymerization catalyst, whereupon the monomer is polymerized. If desired, this latter operation can be combined with the spreading of the dispersion in layer or sheet form. It is also possible to disperse the conductive particles in a solution of the polymer and to form a layer or sheet of dispersion by evaporating the solvent.

The invention contemplates a method of using this material for recording and reproducing information in the form of electric conductivity differences, which method comprises exposing at least part of the surface of the material to irradiation by activating radiations so as to define an image on this surface, then swelling or partly dissolving the binder to vary the distance between the conductive particles and hence the electric conductivity of the dispersion, and developing the thus defined image by any known process.

The swellable parts of the material can be made to swell either by heating or by the action of a suitable swelling liquid.

The choice of swelling liquid depends on the binder that is used. Use can for example be made of water, ethyl alcohol, acetone, benzene or a mixture of these substances. By way of swelling liquid use can also be made of mixtures in suitable proportions of at least one binder solvent and at least one non solvent liquid. Where the dispersion layer is used without a support, it is immersed in a bath of swelling liquid for the length of time needed to produce a sufficient degree of swelling. When the material is used in the form of a layer of dispersion applied in coating form on a support, the free surface of the dispersion is moistened as homogeneously as possible with the swelling liquid.

Under the action of the swelling liquid or of the heat, the binder swells to an extent which differs between the irradiated parts and those parts that have not been irradiated or been irradiated more slightly. This causes the mean distance between the conductive particles and consequently the resistivity of the part of the material under consideration to increase. There is thus performed a first stage in the development of the image which becomes formed by various regions having a conductivity which is an inverse function of the extent of swelling and hence, depending on the case, a direct function or an inverse function of the amount of irradiation.

The next stage in the development of the image consists in rendering the latter visible. To this end, use is made of the electric conductivity differences between the various regions of the material. Depending on the absolute value of the conductivity of the regions of the material and the relationship between the conductivity of one region and that of another, various known electrophotographic image development methods can be used; they do not therefore form part of the invention. Some of these methods are for example described in the following work: Electrophotography, by R. M.

SCHAFFERT, The Focal Press London and New York (1965).

With some of these methods the image can be made to appear on the surface of the actual material and with others the image can be transferred in visible or invisible (latent image) form from the surface of the material to that of another material which may be termed "receiving material" or "auxiliary support." This "receiving material" may be paper, either special or ordinary.

One method enabling the image to appear on the surface of the actual material consists in charging the surface of the material, on the dispersion side, with positive or negative electrostatic charges, at a density which is an inverse function of the conductivity of the material. For this, any known means may be resorted to, e.g. a corona discharge device. The latent image that consists of regions of different conductivity is thus transformed into a corresponding latent image consisting of regions that are electrostatically charged at the surface. The image can then be made visible by the so-called "cascade" method which consists in sprinkling the surface of the material with a powder which has been electrostatically charged by triboelectric friction and which is made up of two kinds of particles, i.e. the toner, a black or coloured powder whose tint or colouring contrasts with the initial tint or colouring of the material, and the carrier, a coarser grained powder which serves to generate the electrostatic charges of the toner. The toner and the carrier are so chosen that the toner acquires a charge of opposite sign to that of the charge of the material so that the toner particles are selectively attracted by the charged regions of the image, with the density of the particles corresponding to that of the charge of the various regions. With the surface of the material being placed in an inclined position, a large number of the toner particles are electrostatically attracted by the charged regions of the image and become separated from the carrier particles to be deposited on the surface of the material. All that remains to be done is to fix the toner particles on the surface of the material and this can be done by a slight heating action: when the binder is thermofusible at least in the state in which it finds itself in the image regions on which the toner particles become fixed, this heating action, if it is suitably regulated, serves superficially to soften the material and to retain the toner particles thereon. Once the binder has cooled and hardened, the toner remains definetely fixed. By way of alternative, use can be made for the toner of a substance which can be softened and/or become tacky upon being slightly heated and which remains definitely fixed after cooling, e.g. a thermoplastic polymer. The toner can also be deposited on the charged regions of the material by other known methods, for instance those which are also described in the above mentioned document, e.g. the brushing method (fur brush or magnetic brush), the impression method with a mohair roller, the method involving the production of a cloud of powder, the method involving the production of an aerosol of charged liquid droplets, and the electrophoresis method.

It is also possible to deposit a powder having a colouring which contrasts with that of the dispersion without first charging the surface of the material, i.e. by directly using the latent image consisting of regions of different conductivity. This may for instance be done by electrolysis of a suitable substance, e.g. an aqueous solution of one or more metal salts having coloured ions having a suitable colouring, with the cathode being formed by the material carrying the latent image consisting of regions of different conductivity. Another way is by electrophoresis of a suspension of charged black or coloured particles with the material being used as the electrode of opposite sign to that of the charge in the particles. In both cases, the ions and the charged particles are selectively attracted by the most conductive regions of the image and discharge themselves on these regions. It is also possible to obtain a very progressive and extensive colouring intensity range by resorting to these latter two developing methods. The fixing of the image, once developed, can be done in the above indicated manner. One method for transferring the image from the surface of the material to that of another material for example consists in first developing the image on the material as such in the form of a deposit of block or coloured powder or particles, by one of the above described methods, but without fixing the powder, and in then transferring by contact, with the use of an adhesive, and/or by electrostatic attraction, at least part of this powder in the form of an image on the receiving material. It is also possible to transfer on to the receiving material the latent image consisting of electrostatic charges and produced as indicated earlier from the latent image that consists of regions of different conductivity, and then makes visible the image on this receiving material by one of the above-described methods. It is also possible to form on the receiving material the latent image that consists of electrostatic charges by injecting such charges, directly using in so doing the latent image that consists of regions of different conductivity of the original image.

With the development or image transfer techniques that have just been described or mentioned and with the other known electrophotographic techniques, it is possible to use the material according to the invention either as a final document or as an intermediate document. In this latter case, the material can be used as a master for preparing several final documents (copies) or for producing one or more other masters used for the preparation of copies.

The material according to the invention can be used for reproducing documents, printed texts or images, for photographing, for instance in the X-ray field, ultraviolet radiations and also infra-red radiations. In particular, it can be used for recording the movements of an electron beam with a view to reading a measurement made by means of a measuring instrument or apparatus, for taking pictures in electronic microscopy, etc.

EXAMPLE 1

A recording material, consisting of a sheet of polyvinyl cinnamate having a thickness of 100 microns in the initial state and containing copper powder in homogeneous form is prepared as follows:

30 percent by volume of copper powder is dispersed, by vigorous agitation, into 70 percent by volume of solution consisting of 40 percent by weight of polyvinyl cinnamate in xylene. For the copper powder, use is made of a powder having a grain size corresponding to the distribution indicated in the table below:

| Number percentage of particles having a given size | Mean particle size (in microns) |
|---|---|
| 14.5 | 1 |
| 16.5 | 1.5 |
| 16 | 2 |
| 8.5 | 3 |
| 5.5 | 4 |
| 4.5 | 5 |
| 4 | 6 |
| 3.5 | 7 |

The resulting dispersion is spread over a plate so as to form a film and the xylene is left to evaporate so as to produce a flexible sheet having sufficient mechanical strength to enable it to be detached from the surface of the plate.

The transverse electric resistivity of this sheet is $5 \times 10^2$ ohm. cm.

A latent image is formed on this material, through irradiation with a mercury vapour lamp (having a power of 125 W and a radiant action defining peaks at 2,805, 2,884, 2,968, 3,025, 3,129, 3,342, 3,658, 4,062, 4,353, 5,461, 5,780 and 6,924 Angstroem) for 20 minutes, by inserting a mask, consisting of a photographic negative placed parallel to the surface of the material, between the latter and the radiant source.

The material, thus exposed, is then dipped for five minutes into a bath of swelling liquid consisting of a mixture of 50 percent by volume of methanol and of 50 percent by volume of xylene.

The parts of the material that are completely protected from irradiation by the opaque regions of the negative swell and come to have a thickness of 110 microns, which corresponds to a resistivity of $2 \times 10^6$ ohm. cm. The parts that were irradiated through the transparent regions of the negative retain practically the same thickness and the same resistivity as in their original state.

The resulting latent image is formed by regions of different conductivity is then developed by electrolysis, the procedure being as follows: the material is pressed gently and uniformly between two flat nickel electrodes of an electroplating apparatus, after having applied a sheet of galvanoplastic paper imbibed with an electroplating solution called "black nickel" having a pH lying between 6.6 and 6.9 (composition of this solution, for 20 litres of solution: ammoniacal nickel sulphate 2 kg dissolved in 7 litres of distilled water; ammonium sulphate solution 0.1 kg + ammonium sulphocyanide 0.6 g in 2 litres of distilled water, zinc sulphate 0.38 kg + balance of distilled water for 20 litres) between the material and the anode of the electroplating apparatus. After 8 minutes of electrolysis at a temperature of 35° C (V = 1 V; I = 100 mA/dm$^2$) the most conductive parts of the material which correspond to the irradiated parts and hence to the transparent regions of the photographic negative, appear in black on the surface of the material. There is thus obtained a positive visible image of the photograph.

EXAMPLE 2

A recording material is prepared similar to that described in example 1 but including, in addition to the sheet of polyvinyl cinnamate laden with copper particles, a sheet of aluminum having a thickness of 15 microns and coated on one of its sides with the sheet of polymer.

The material is prepared in the same way as the material described in example 1, but the dispersion of copper in polyvinyl cinnamate is spread over an aluminium sheet 15 microns thick instead of being poured directly on the plate and this sheet is left adhering to the aluminium sheet after evaporation of the xylene.

This material is used in the same way as that described in example 1, but with the aluminium sheet acting as an electrode during the electrolytic development of the image.

EXAMPLE 3

A recording material similar to that described in example 1 is prepared as in that example in the form of a sheet having an initial thickness of 100 microns, but with 5 percent by volume of copper instead of 30 percent.

A latent image is formed of a photographic negative by irradiation and swelling in a bath of swelling liquid in the manner described in example 1.

The irradiated parts retain practically the same thickness (100 microns) and the same resistivity as in their original state, i.e. $10^9$ ohm. cm.

The parts that were completely protected from irradiation by the opaque regions of the negative swell and reach a thickness of 110 microns, which corresponds to a resistivity of $10^{14}$ ohm. cm.

The resulting latent image, consisting of regions of different conductivity, is then developed electrostatically, the procedure for this being as follows:

The entire surface of the material is subjected to a corona discharge, by scanning in a plane parallel to the surface of the material, with the aid of four tungsten wires which lie parallel to each other and which are also kept parallel to the material, at a distance of 1 cm from the surface of the latter, there being applied between these wires and the material a potential difference of 5 kV. There is thus formed on the surface that is exposed to the corona discharge a uniform superficial charge of electrons which lasts for some tens of seconds in the most resistive parts of the material (those that have been subjected to swelling, i.e., the non irradiated parts) but which discharges in a few fractions of a second in the least resistive parts (those whose thickness has not changed, i.e., the irradiated parts). The thus created electrostatic latent image is made visible by sprinkling the surface of the material, when placed in an inclined position, with a mixture of toner powder (RANK-XEROX 04/E/007), having a grain size of the order of 5 microns, and of glass micropellets having a diameter of the order of 0.5 to 1 mm.

The toner powder remains fixed, by electrostatic attraction, to the parts of the material which retain their electron charges longest, i.e., those which correspond to the opaque regions of the negative, and a negative visible image is obtained by using a toner having a darker colouring than the copper colouring of the material and a positive visible image of the photograph is obtained by using a toner having a lighter colouring, e.g. white, than that of the material.

The image which has thus been made visible is fixed to the material as such by uniformly heating, with the aid of an infra-red ray lamp, the surface in such a way as superficially to melt the toner particles that remain definitely fixed, after cooling, on the surface of the material.

EXAMPLE 4

The procedure is as in example 3 but instead of fixing the image to the actual material, the toner powder is transferred by adhesion on to a sheet of paper which has been uniformly coated, just before the transfer, by atomization, with a thin layer of a substance having moderate adhesive properties when moist and which hardens when dry, so as to form a definitive document. After this transfer, toner powder is again electrostatically applied to the material and the toner is then again transferred by adhesion on to a sheet of paper to produce a second copy identical to the first. In this way, a practically unlimited number of copies can be produced.

EXAMPLE 5

The procedure is as set forth in example 4, using the material as a duplicating master, but instead of transferring the toner powder on to the paper by adhesion, for the production of copies, the transfer is made by applying an electric field between the material and the paper.

EXAMPLE 6

The procedure is as set forth in examples 4 and 5 but using a material which comprises, besides the sheet of polyvinyl cinnamate laden with copper particles, an aluminum sheet 15 microns thick applied to one side of the polymer sheet and adhering thereto. This aluminium sheet acts as an electrode while the surface of the material is being electrostatically charged by corona discharge and also, as the case may be, during the transfer by electrostatic attraction of the toner powder on to the support of the definitive document.

EXAMPLE 7

A recording material which is sensitive to ultra-violet radiant action is prepared in a manner similar to that described in example 2, with the following characteristics:

- a conductive support: an aluminium sheet 15 microns thick
- ultra-violet ray sensitive layer 20 microns thick: a suspension comprising 30 percent by volume of tungsten powder (grain size: 2 microns) in an isoprene polymer (a product known in the trade under the name of KMER, the initials of Kodak Metal Etch Resist, and made by Eastman - Kodak). For this, use is made of a solution containing 30 percent by weight of KMER in xylene (a 27 percent by weight solution of KMER isoprene polymer in xylene has a viscosity of 504 centipoises).

On this material is formed a latent image of a text type-written in black on translucid paper, by resorting to a procedure similar to that described in example 1 involving irradiation with the ultra-violet radiation emitted by the same mercury vapour lamp as that mentioned in the said example. Irradiation time is 20 minutes.

After irradiation, the surface of the material is uniformly heated for 5 minutes at 120° C. The non-irradiated parts of this surface swell and acquire a resistivity value of $6.3 \times 10^3$ ohm. cm, whereas the irradiated parts practically do not swell, their resistivity acquiring a value of 185 ohm. cm. The resulting latent image is then developed by electrolysis in the manner described in example 1.

EXAMPLE 8

A recording material which is sensitive to ultra-violet radiant action and which is identical to the material described in example 7, except in that its radiation sensitive layer contains 20 percent by volume of tungsten powder instead of 30 percent by volume, is prepared in the same way as in that example.

A latent image of a text type-written on translucid paper is formed on this material by irradiation with ultra-violet rays in the manner indicated in example 7. The irradiation time, instead of being 20 minutes, is here only 10 minutes but the sensitive surface of the material is then put in contact, after irradiation, for 10 minutes, with a mixture of solvents containing 20 percent by volume of xylene and 80 percent by volume of methanol. The non irradiated parts of the surface of the material are thus caused to swell and to acquire a resistivity value of $2.10 \times 10^8$ ohm. cm. The irradiated parts practically do not swell and their resistivity is $2.5 \times 10^3$ ohm. cm.

The resulting latent image is then developed as described in example 1.

EXAMPLE 9

A recording material which is sensitive to ultra-violet radiant action and which is identical to the material described in example 7, except in that its radiation sensitive layer contains 2 percent by volume of tungsten powder instead of 30 percent by volume, is prepared in the same way as in that example.

A latent image of a text type-written on translucid paper is formed on this material by irradiation with ultra-violet rays in the manner indicated in example 8. After irradiation, for 10 minutes, the surface of the sensitive layer of the material is put in contact for 10 minutes with a mixture of 50 percent by volume of xylene and 50 percent by volume of methanol. In the non irradiated parts of the material the polymer is partially dissolved thus causing a reduction in the thickness of these parts of the material and hence an increase in the metallic powder concentration. The irradiated parts undergo no change. There is thus obtained an electrostatic contrast of 450 volts between the irradiated parts and the non irradiated parts and a residual potential of 200 volts.

The resulting latent image is then developed electrostatically in the manner described in example 3.

EXAMPLE 10

A recording material which is sensitive to the action of X-rays and which is similar to the material described in example 7, is prepared in the same way as in that example but with the following particulars:

- conductive support: aluminium sheet 15 microns thick
- X-ray sensitive layer (original thickness: 25 microns): a suspension comprising 10 percent by volume of tungsten powder of very fine grain size (0.5 micron) in an isoprene polymer (a product known in the trade under the name of KMER, the initials of Kodak Metal Etch Resist, and made by Eastman-Kodak).

On this material is formed by X-ray irradiation a radiographic latent image of a mechanical component having some parts which are opaque and other parts which are transparent to X-rays, such component being placed between the material and an X-ray source.

The irradiation conditions are as follows:

| | |
|---|---|
| nature of the anticathode | copper |
| applied voltage | 50 kV |
| current intensity | 20 mA |
| exposure time | 5 seconds |

After irradiation the surface of the sensitive layer of the material is put in contact for 10 minutes with a mixture of 50 percent by volume of xylene and 50 percent by volume of methanol. Because of the phenomenon of partial dissolution of the isoprene polymer in the non irradiated parts, described in example 9, there is obtained an electrostatic contrast of 500 volts between the irradiated parts and the non-irradiated parts, with a residual potential of 200 volts.

The resulting latent image is then developed electrostatically in the manner described in example 3.

I claim:

1. A method of recording and reproducing information in the form of electrical conductivity differences, said method comprising exposing the surface of a recording material to irradiation by activating radiations in the form of an image, at least part of the thickness of said recording material, from the surface thereof, consisting of a homogeneous dispersion of electrically conductive particles in an insulating binder consisting essentially of a substance or composition having swelling and solubility properties at least one of which can be modified according to said image through exposure to activating radiations, said material being adapted to yield a recording of information in the form of electrical conductivity differences, so as to define said image on the surface, then swelling or partly dissolving the binder to vary the distance between the conductive particles and hence the electric conductivity of the dispersion and developing the thus defined image.

2. A method according to claim 1, wherein the binder is made to swell under the action of a solvent.

3. A method according to claim 1, wherein the binder is made to swell under the action of heat.

4. A method according to claim 1 wherein the developing of the latent image consisting of regions of different conductivity into a visible image on the material is effected by selectively depositing a substance having a coloring which contrasts with the original coloring of the dispersion on certain parts of the surface of the material thereby to produce a positive or a negative of the image.

5. A method according to claim 4, in which the image is developed by electrolysis.

6. A method according to claim 5, which comprises using, as an electrolyte, an aqueous solution of at least one metallic salt having colored or black ions.

7. A method according to claim 4, in which the image is developed by electrophoresis of a suspension of electrically charged colored or black particles.

8. A method according to claim 6, which comprises using as a binder for the dispersion of conductive particles a substance capable of becoming adhesive by slight heating at least in the parts corresponding to the regions of the image on which the colored or black ions are deposited, and fixing the image by heating the surface of the material to a temperature slightly greater than that which is necessary to render the binder adhesive at least in these latter regions.

9. A method according to claim 7, which comprises using as a binder for the dispersion of conductive particles a substance capable of becoming adhesive by slight heating at least in the parts corresponding to the regions of the image on which the colored or black ions are deposited and fixing the image by heating the surface of the material to a temperature slightly greater than that which is necessary to render the binder adhesive at least in these latter regions.

10. A method according to claim 6, which comprises transferring the visible image which is materialized by the colored or black substance deposited by electrolysis on the surface of the material onto a receiving material and fixing the thus transferred image on the surface of the receiving material.

11. A method according to claim 7, which comprises using, as electrically charged particles, particles of a substance capable of becoming adhesive by slight heating, and fixing the image by heating the surface of the material to a temperature slightly greater than that needed to render said charged particles adhesive.

12. A method according to claim 7, which comprises transferring by electrostatic attraction the visible image which is materialized by the colored or black substance deposited by electrophoresis at the surface of the material onto a receiving material, and fixing the thus transferred image on the surface of the receiving material.

13. A method according to claim 1, which comprises transforming on the material the latent image, formed by differences of conductivity, into a latent image formed by electrostatic charges.

14. A method according to claim 13, which comprises effecting such transformation by subjecting the material, after irradiation thereof, to a corona discharge uniformly distributed over its surface.

15. A method according to claim 13, which comprises developing the latent image formed of electrostatic charges on the actual material.

16. A method according to claim 13, which comprises transferring the electrostatic image onto a receiving material and then developing the latent image formed of electrostatic charges on the receiving material.

17. A method according to claim 13, which comprises directly transferring onto a receiving material, through injection of electrostatic charges, the latent image formed of electrostatic charges from the latent image formed of different conductivity regions of the original material.

18. A method according to claim 17, in which the latent image formed of electrostatic charges is developed on the receiving material.

19. A method according to claim 15, in which the image is developed by a dry electrostatic process.

20. A method according to claim 15, in which the image is developed by electrophoresis.

21. A method according to claim 1, which comprises using the material as a definitive document.

22. A method according to claim 1, which comprises using the material as a master for the preparation of a plurality of copies.

* * * * *

Dedication

3,826,573.—*Paul Heinzer,* Geneva, Switzerland. METHOD OF RECORDING AND REPRODUCING INFORMATION IN THE FORM OF ELECTRICAL CONDUCTIVITY DIFFERENCES. Patent dated July 30, 1974. Dedication filed Mar. 26, 1984, by the assignee, *Battelle Memorial Institute.*

Hereby dedicates to the People of the United States the entire remaining term of said patent.

[*Official Gazette June 12, 1984.*]